United States Patent Office 3,530,105
Patented Sept. 22, 1970

3,530,105
PROCESS FOR MAKING HIGH MOLECULAR WEIGHT POLYMERS
Kent S. Dennis and Donald A. Maass, Midland, Mich., assignors to The Dow Chemical Company, Midland, Mich., a corporation of Delaware
No Drawing. Filed Aug. 28, 1967, Ser. No. 663,550
Int. Cl. C08f 7/04, 15/04
U.S. Cl. 260—88.2                                 15 Claims

ABSTRACT OF THE DISCLOSURE

A process for making monoalkenyl aromatic hydrocarbon polymers having a molecular weight of at least about 500,000 which involves contacting the monomeric reaction mixture with a combination of anionic initiators: an organolithium compound and a complex or addition compound of an alkali metal having an atomic weight between 39 and 133 with a polynuclear aromatic compound or with alpha-methylstyrene, useful for making molded articles.

---

This invention concerns a novel process for preparing alkenyl aromatic hydrocarbon polymers of very high molecular weight, e.g. on the order of about 500,000 to 5,000,000 or more.

It is known to prepare polymers of alkenyl aromatic hydrocarbon monomers such as styrene having molecular weights up to 300,000 or thereabout with (1) an ether solution of (a) an addition compound or complex of an alkali metal and a polynuclear aromatic compound, or (b) the addition compound or complex of an alkali metal and alpha-methyl styrene, or with (2) a hydrocarbon solution of an organolithium compound, as the catalyst or polymerization initiator. Such polymerization systems are characterized as anionic in nature.

It is known that such polymers prepared in an anhydrous organic ether or a hydrocarbon solvent as the case may be are referred to as anionic, "living" polymers. Ideally, so long as the polymer is maintained free from contact with agents or impurities which kill the living polymer, the polymer molecules can grow to any desired molecular weight by adding monomer to the system and continuing the polymerization. Thus, ideally, polymers of monoalkenyl aromatic hydrocarbons, e.g. styrene, can readily be prepared having a desired molecular weight by controlling the relative proportions of the catalyst material and the monomer employed, and the polymerization conditions.

In practice, however, it is known that ideal conditions seldom obtain. Thus, polymers of any desired molecular weight, particularly those of very high molecular weight, e.g. 500,000 to 5,000,000 or more, cannot usually be prepared using either of the two general anionic polymerization initiator systems heretofore described, much less the more commonly used thermal and/or free radical polymerization systems.

It is a principal object of this invention to provide a process for preparing polymers of monoalkenyl aromatic hydrocarbons of substantially controlled, very high molecular weights, e.g. on the order of about 500,000 to 5,000,000 or more.

It is another object to provide such a process which utilizes cheap and abundant hydrocarbon solvents as the reaction medium.

It is still another object to provide such a process which results in substantially complete polymerization.

It is yet another object to provide such a process which has very short polymerization times, e.g. on the order of 5–15 minutes instead of hours, days, or even weeks.

The foregoing and additional objects and cognate advantages and benefits are obtained by polymerizing a monomeric monoalkenyl aromatic hydrocarbon in a hydrocarbon solvent in contact with a combination of anionic polymerization initiators: (1) an organolithium compound and (2) an organic ether solution of a complex or addition compound of an alkali metal having an atomic weight between 39 and 133 with (a) a polynuclear aromatic compound or with (b) alpha-methylstyrene.

Among monomeric monoalkenyl aromatic hydrocarbons suitable for use in the invention are one or more of the series vinyl naphthalenes, styrene and substituted styrenes, for example, alpha-alkylstyrenes, nuclear-substituted alpha-alkylstyrenes, alkylstyrenes, arylstyrenes, alkarylstyrenes, and the like.

The monomer is dissolved in a hydrocarbon solvent suitable therefore which is a liquid under the conditions employed, the concentration of the monomer in solution usually ranging between about 5 and 25, and preferably between about 10 and 15, percent by weight.

Any inert hydrocarbon solvent which will dissolve the monomer and the polymer being formed is suitable for use in the process of the invention. Among hydrocarbon compounds suitable for use as a solven are saturated cycloaliphatic hydrocarbons containing at least five carbon atoms and aromatic hydrocarbons, for example, cyclopentane, cyclohexane, methylcyclohexane, benzene, toluene, xylene, and the like, as well as mixtures thereof and mixtures of a major proportion of at least 50 percent by weight of such hydrocarbons with a minor proportion of saturated aliphatic hydrocarbons, for example, n-pentane, n-hexane, n-octane, n-dodecane and the like.

As stated heretofore, the polymerization reaction is carried out in a hydrocarbon solvent using a combination of two types of anionic initiators. Examples of suitable initiator materials of the first type of anionic initiators are the organolithium compounds such as described in U.S. Pat. No. 3,297,793, e.g. ethyl lithium, n-butyl lithium and phenyl lithium. This initiator material is usually employed in amounts corresponding to that which is required to remove or blank the impurities in the monomer/solvent system such as by "titration." The monomer serves as an indicator by changing color at the end point. It is a preferred practice to keep the temperatures of the monomer/solvent system at about room temperature or slightly below for titrating the impurities. Ordinarily, no polymerization initiated by the organolithium compounds will take place unless the temperature of the system is raised to 50–60° C. or thereabout.

In the process of the invention, it is primarily the second of the two types of initiator materials which actually initiates the polymerization reaction after the organolithium compound has removed or blanked the impurities. Examples of the second type of initiator materials are (1) the complexes or addition compounds of alkali metals having an atomic weight between 39 and 133, e.g. potassium, rubidium or cesium, with polynuclear aromatic compounds, e.g. naphthalene, anthracene, phenanthrene, biphenyl, chrysene, pyrene, or p-terphenyl, or (2) the complex or addition compound of an alkali metal such as heretofore described with alpha-methylstyrene. This second type of initiator material is usually employed in amounts corresponding to from about $0.2 \times 10^{-5}$ to $0.2 \times 10^{-6}$ equivalent proportion per equivalent proportion of the monoalkenyl aromatic hydrocarbon to be polymerized or in amount sufficient to produce a polymer having a molecular weight of at least about 500,000. The polymerization of the monomers can be easily controlled to form polymers of very high molecular weight, e.g. in the order of about 500,000–5,000,000 or more, by controlling the ratio of the monomer to the second type of initiator material.

The complexes or addition compounds of the second type of initiator are usually employed or added to the reaction mixture in the form of a solution in a substantially anhydrous inert liquid solvent comprising an organic ether. Suitable solvents are aliphatic ethers, e.g. dimethyl ether, methyl ethyl ether, methyl isopropyl ether, dimethyl ether of ethylene glycol, or cyclic ethers, e.g. 1,4-dioxane, tetrahydrofuran, tetrahydropyrane, or tetrahydro-2-methylfuran, and the like. The cyclic ethers are preferred. The presence of a very small amount of the ether in the reaction mixture permits the polymerization reaction to start at room temperature or thereabout, which is preferred.

The polymerization can be carried out at temperatures between about 0° C., preferably between about room temperature, and 60–80° C., and at atmospheric, subatmospheric or superatmospheric pressure. After polymerization starts, cooling can be applied to remove heat. Temperatures above about 60–80° C. promote self-termination of chain ends, and if the temperature is too low polymerization becomes far too slow.

If desired, the polymer chain ends can be terminated with any proton donating compound.

It is important that the polymerization be carried out in an inert atmosphere and under anhydrous conditions.

The product is recovered in the usual ways, suitably by devolatilization or precipitation in a non-solvent.

The very high molecular weight polymeric compositions produced by the process of the invention are useful for molded articles, films, fibers, etc.

The following non-limiting examples serve to illustrate the invention.

EXAMPLE 1

(A) A potassium/naphthalene complex or addition compound was made in the following manner. Tetrahydrofuran (THF) was purified by distilling it from a sodium biphenyl complex. 487 ml. was distilled into a three-neck round-bottom flask equipped with stirrer, nitrogen inlet, and reflux condenser. The flask had previously been purged with nitrogen. 6.41 grams of naphthalene were dissolved in the THF. A sodium potassium alloy was made by melting 2.0 grams of potassium in 3 grams of melted sodium. The liquid alloy was added dropwise and with stirring to the naphthalene solution. After reaction was complete, a ball of sodium metal remained in the flask. The complex was analyzed by adding 10.0 ml. to n-butylbromide and titrating the liberated bromide ions by the standard Mohr titration. A 0.0940-normal solution of potassium/naphthalene complex was obtained.

(B) Most of the moisture was removed from thiophene-free benzene by drying it over calcium hydride. A three-neck flask equipped with stirrer, reflux condenser, and entrance port was purged with nitrogen. 450 ml. of benzene and 50 ml. of distilled styrene monomer were added. A 1.6-normal solution of n-butyl lithium in hexane was added dropwise until the solution turned yellow and held its color. 1.85 ml. of the complex or addition compound prepared in Part A above were then added and the solution immediately became red-orange in color. After a few seconds the solution began to heat and become viscous. After a few minutes the solution was noticeably cooling and the polymerization reaction was terminated with a few drops of glacial acetic acid. The yield of polystyrene product was essentially 100 percent. It was analyzed and the viscosity (determined as a 10 percent solution of polymer in toluene at 25° C.) was found to be 136.4 cps. indicating a molecular weight of about 500,000. The notched Izod impact strength was found to be 0.42 ft.-lb./in. notch and the Vicat heat distortion was found to be 107° C.

EXAMPLE 2

A procedure similar to that used in Example 1 was followed except for adding 0.92 ml. of complex or addition compound prepared in Example 1 as initiator. Polymerization was slightly less rapid but the yield of product was 100 percent. The polystyrene product was analyzed and found to have a molecular weight of about 1,200,000 as determined by inherent viscosity measurements. The notched Izod impact strength was determined to be 0.43 ft.-lb./in. notch.

EXAMPLE 3

The potassium/naphthalene complex prepared in Example 1 was retitrated after 24 hours and its normality determined to be 0.0928.

A procedure similar to that used in Example 1 was followed except for using 0.234 ml. of complex or addition compound as initiator. The yield of polystyrene product was essentially 100 percent and was found to have a molecular weight of about 4,200,000 as determined by inherent viscosity measurements. Notched Izod impact strength was found to be 0.43 ft.-lb./in. notch.

EXAMPLE 4

(A) A potassium/alpha-methylstyrene complex or addition compound was prepared by a procedure similar to that used in Example 1A except for mixing 13 ml. of alpha-methylstyrene in 487 ml. of distilled THF. A 0.1091-normal solution of potassium/alpha-methylstyrene complex was obtained.

(B) A procedure similar to that of Example 1 was followed except for using 850 ml. of thiophene-free benzene and 250 ml. of distilled styrene monomer. After titrating the impurities with n-butyl lithium initiator, 1.99 ml. of the complex or addition compound prepared in part A were then added to polymerize the reaction mixture. Reaction was immediate and the material foamed as it warmed. There was obtained a polystyrene product having a molecular weight of about 1,900,000 as determined by inherent viscosity measurements. The notched Izod impact strength was found to be 0.42 ft.-lb./in. notch and the Vicat heat distortion temperatures was found to be 106° C.

EXAMPLE 5

The potassium/alpha-methylstyrene complex prepared in Example 4A was retitrated after 48 hours and the normality was found to be 0.0834.

Following a procedure similar to that used in Example 1, 900 ml. of benzene and 150 ml. of styrene monomer were mixed in a two-liter flask and titrated with n-butyl lithium. Then 0.663 ml. of the complex was added to polymerize. A polystyrene product was obtained having a molecular weight of about 3,000,000 as determined by inherent viscosity measurements. The notched Izod impact strength was found to be 0.71 ft.-lb./in. notch and the Vicat heat distortion was 104° C.

EXAMPLE 6

(A) A potassium/naphthalene complex or addition compound was made following a procedure similar to that described in Example 1A except for using 500 ml. of distilled THF. The normality of the complex solution was 0.0878.

(B) Using a procedure similar to that described in Example 1, the following results were obtained.

TABLE I

| Monomer | Solvent | Ml. of complex prepared in 6A | Mol. wt. of polymer product |
| --- | --- | --- | --- |
| Run: | | | |
| 1...... 150 ml. styrene | 900 ml. cyclohexane | 2.97 | 850,000 |
| 2........do | 600 ml. benzene; 300 ml. hexane | 1.54 | 1,200,000 |
| 3...... 150 ml. vinyl toluene | 900 ml. benzene | 5.38 plus 1 ml. THF | 480,000 |

EXAMPLE 7

The complex or addition compound prepared in Example 6A was retitrated after 72 hours. The normality was found to be 0.0698.

This complex was used in the preparation of a polystyrene product following a procedure similar to that described in Example 1 except for using 150 ml. of styrene monomer, 900 ml. of benzene and 6.98 ml. of complex. There was obtained 129 grams of product having a molecular weight of about 620,000 as determined by inherent viscosity measurements.

EXAMPLE 8

(A) A potassium/biphenyl complex or addition compound was prepared by a procedure similar to that followed in Example 6A except that 7.71 grams of biphenyl was used instead of naphthalene. The solution of the complex had a normality of 0.0870.

(B) A procedure for preparing polymer product was followed similar to that followed in Example 7 except for using 2.0 ml. of the complex prepared in Part A. The reaction solution retained an orange color after 45 minutes had elapsed. There was obtained 151 grams of polystyrene product having a molecular weight of about 1,650,000 as determined by inherent viscosity measurements and a Vicat heat distortion temperature of 107.4° C.

EXAMPLE 9

(A) A potassium/chrysene complex or addition compound was prepared following a procedure similar to that described in Example 1A except for using 2.28 grams of chrysene, 100 ml. of distilled THF, and sodium potassium alloy made from 1.5 grams of sodium and 1.0 gram of potassium. The solution of complex had a normality of 0.183.

(B) A polystyrene product was prepared following a procedure similar to that described in Example 7 except for using 1.42 ml. of solution of the complex prepared in part A. There was obtained 141 grams of product having a molecular weight of about 1,150,000 as determined by inherent viscosity measurements and a Vicat heat distortion temperature of 108.2° C.

EXAMPLE 10

(A) A potassium/p-terphenyl complex or addition compound was prepared following a procedure similar to that used in Example 9A except for using 2.30 grams of p-terphenyl instead of chrysene. The solution of the complex had a normality of 0.172.

(B) A polystyrene product was prepared following a procedure similar to that described in Example 7 except for using 0.76 ml. of the solution of the complex prepared in part A. The complex precipitated as a black precipitate on adding it to the solution of monomer, but slowly dissolved giving a red colored solution. There was obtained 145 grams of product having a molecular weight of about 2,400,000 as determined by inherent viscosity measurements and a Vicat heat distortion temperature of 106.4° C.

EXAMPLE 11

(A) A potassium/pyrene complex or addition compound was prepared following a procedure similar to that described in Example 9A except for using 2.02 grams of pyrene instead of chrysene. The solution of the complex had a normality of 0.264.

(B) A polystyrene product was prepared following a procedure similar to that described in Example 1B except for using 100 ml. of styrene monomer, 600 ml. of benzene, and 0.44 ml. of solution of the complex prepared in part A. The reaction solution turned pink in color and did not fade. There was obtained 90 grams of product having a molecular weight of about 5,750,000 as determined by inherent viscosity measurements and a Vicat heat distortion temperature of 107.3° C.

EXAMPLE 12

(A) A rubidium/naphthalene complex or addition compound was prepared following a procedure similar to that described in Example 1A except for using 1.24 grams of rubidium, 1.85 grams of naphthalene and 250 ml. of distilled THF. The solution was warmed enough to keep the rubidium fluid while it reacted. The solution of the complex had a normality of 0.0402.

(B) A polystyrene product was prepared following a procedure similar to that described in Example 1B except for using 125 ml. of styrene monomer, 800 ml. of benzene and 1.80 ml. of the solution of complex prepared in part A. There was obtained 117 grams of product having a molecular weight of about 2,900,000 as determined by inherent viscosity measurements.

EXAMPLE 13

(A) A potassium/naphthalene complex or addition compound was prepared following a procedure similar to that described in Example 1A except for using 3.28 grams of naphthalene, 250 ml. of distilled THF and a sodium potassium alloy made from 1.5 grams of sodium and 1.0 gram of potassium. The solution of the complex had a normality of 0.1028.

(B) A copolymer product of styrene and alpha-methylstyrene was prepared following a procedure similar to that described in Example 1B except for using 125 ml. of styrene monomer, 30 ml. of alpha-methylstyrene monomer, 800 ml. of benzene and 2.56 ml. of the solution of complex prepared in Part A. The reaction solution had a red color which hardly faded. The polymerization reaction was killed with glacial acetic acid. There was obtained 123 grams of product having a molecular weight of about 810,000 as determined by inherent viscosity measurements and a Vicat heat distortion temperature of 110° C.

(C) A copolymer product of styrene and p-tert-butylstyrene was prepared following a procedure similar to that described in part B except for using 100 ml. of styrene monomer, 50 ml. of p-tert-butylstyrene monomer and 2.62 ml. of the solution of complex prepared in part A. The reaction solution had a red color which faded rather rapidly. There was obtained 130 grams of product having a molecular weight of about 870,000 as determined by inherent viscosity measurements and a Vicat heat distortion temperature of 115° C.

EXAMPLE 14

(A) A potassium/alpha-methylstyrene complex or addition compound was prepared following a procedure similar to that described in Example 1A except for using 6.5 ml. of alpha-methylstyrene, 243 ml. of distilled THF and 1.0 gram of potassium instead of the sodium potassium alloy. The solution was heated to the melting point of potassium and stirred. The solution of the complex had a normality of 0.0983.

(B) A polystyrene product was prepared following a procedure similar to that described in Example 7 except for using 1.32 ml. of the solution of complex prepared in part A. There was obtained 143 grams of product having a molecular weight of about 2,050,000 as determined by inherent viscosity measurements and a Vicat heat distortion temperature of 106° C.

(C) A polystyrene product was prepared following a procedure similar to that used in part B except for using 0.53 ml. of the solution of complex. The theoretical degree of polymerization was 50,000. There was obtained 128 grams of product having a molecular weight of about 5,200,000 as determined by inherent viscosity measurements.

We claim:

1. A process for preparing a polymeric composition which comprises (1) treating a monomeric monoalkenyl aromatic hydrocarbon in a hydrocarbon solvent with
    (A) an organolithium compound, capable of initiating polymerization of monoalkenyl aromatic hydrocarbon in hydrocarbon solvent at temperatures above about 50° C., at temperatures below about 50° C. and in an amount not appreciably greater than is required to blank impurities in the monomer solution, and (2) then polymerizing the treated monomer in said solution at temperatures between 0° and 80° C. by adding a polymerization initiator comprising
    (B) a complex or addition compound of an alkali metal having an atomic weight between 39 and 133 with
        (a) a polynuclear aromatic compound, or
        (b) α-methylstyrene;
in amount sufficient to produce a polymer having a molecular weight of at least about 500,000.

2. The process of claim 1 wherein the monoalkenyl aromatic hydrocarbon is styrene.

3. The process of claim 1 wherein the monalkenyl aromatic hydrocarbon is vinyl toluene.

4. The process of claim 1 wherein the monoalkenyl aromatic hydrocarbon is a mixture of styrene and alpha-methylstyrene.

5. The process of claim 1 wherein the monalkenyl aromatic hydrocarbon is a mixture of styrene and p-tert-butylstyrene.

6. The process of claim 1 wherein the monalkenyl aromatic hydrocarbon is alpha-methylstyrene.

7. The process of claim 1 wherein the hydrocarbon solvent is benzene, cyclohexane or a mixture of a major proportion of benzene and a minor proportion of hexane.

8. The process of claim 1 wherein the organolithium compound is n-butyl lithium.

9. The process of claim 1 wherein the initiator of (2) is a complex or addition compound of potassium/naphthalene.

10. The process of claim 1 wherein the initiator of (2) is a complex or addition compound of potassium/alpha-methylstyrene.

11. The process of claim 1 wherein the initiator of (2) is a complex or addition compound of potassium/biphenyl.

12. The process of claim 1 wherein the initiator of (2) is a complex or addition compound of potassium/chrysene.

13. The process of claim 1 wherein the initiator of (2) is a complex or addition compound of potassium/p-terphenyl.

14. The process of claim 1 wherein the initiator of (2) is a complex or addition compound of potassium/pyrene.

15. The process of claim 1 wherein the initiator of (2) is a complex or addition compound of rubidium/naphthalene.

References Cited

UNITED STATES PATENTS

| | | | |
|---|---|---|---|
| 3,031,432 | 4/1962 | Kern. | |
| 3,041,312 | 6/1962 | Boyd. | |
| 3,139,416 | 6/1964 | Lumb et al. | |
| 3,177,190 | 4/1965 | Hsieh. | |
| 3,280,094 | 10/1966 | Forman | 260—94.2 |
| 3,294,768 | 12/1966 | Wofford | 260—83.7 |

JAMES A. SEIDLECK, Primary Examiner

U.S. Cl. X.R.

260—93.5